(12) United States Patent
Eltrop

(10) Patent No.: US 7,171,985 B2
(45) Date of Patent: Feb. 6, 2007

(54) DISTRIBUTOR MODULE FOR VALVE CLUSTERS AND A VALVE CLUSTER

(75) Inventor: Nikolaus Eltrop, Leinfelden-Echterdingen (DE)

(73) Assignee: Festo AG & Co., Esslingen (DE)

( * ) Notice: Subject to any disclaimer, the term of this patent is extended or adjusted under 35 U.S.C. 154(b) by 40 days.

(21) Appl. No.: 10/529,337

(22) PCT Filed: Sep. 15, 2004

(86) PCT No.: PCT/EP2004/010285

§ 371 (c)(1),
(2), (4) Date: Mar. 25, 2005

(87) PCT Pub. No.: WO2005/038266

PCT Pub. Date: Apr. 28, 2005

(65) Prior Publication Data

US 2006/0096649 A1    May 11, 2006

(30) Foreign Application Priority Data

Oct. 14, 2003   (DE)   ................................. 103 47 590

(51) Int. Cl.
*F16K 11/10*   (2006.01)
(52) U.S. Cl. ....................... 137/884; 137/269
(58) Field of Classification Search ................ 137/269, 137/625.6, 884
See application file for complete search history.

(56) References Cited

U.S. PATENT DOCUMENTS

| 4,632,150 | A | 12/1986 | Gagas |
| 5,256,283 | A | 10/1993 | Buettner |
| 5,996,629 | A | 12/1999 | Sato et al. |
| 6,189,571 | B1 * | 2/2001 | Hedlund ..................... 137/884 |
| 6,435,205 | B1 | 8/2002 | Hattori et al. |
| 6,966,341 | B2 * | 11/2005 | Heer ......................... 137/885 |

FOREIGN PATENT DOCUMENTS

| DE | 4143274 A1 | 8/1993 |
| EP | 0463394 A1 | 1/1992 |
| EP | 0846872 A1 | 6/1998 |
| EP | 0855520 A1 | 7/1998 |
| EP | 0678676 B1 | 1/1999 |

* cited by examiner

*Primary Examiner*—John Fox
(74) *Attorney, Agent, or Firm*—Hoffmann & Baron, LLP

(57) ABSTRACT

In the case of a distributor module for valve clusters, which possess a principal valve supplied with pressure medium by way of a supply duct and at least one pilot control valve, serving for controlling same and supplied by way of at least one pilot control supply duct with pilot control pressure medium, the distributor module has a supply duct section and two pilot supply duct sections, which are able to be coupled with the supply duct or, respectively, with a respective pilot control duct of the valve cluster, an interface for the connection of the duct sections with each other, with which a control element is associated, which is so designed that different switching conditions may be set, in which the supply duct section and the pilot supply duct sections are differently put in circuit with each other. At least one first switching condition may be set, in the case of which the two pilot supply duct sections are connected together in circuit and simultaneously are separated from the supply duct section or at least one second switching condition may be set, in the case of which all duct sections of the distributor module are put in circuit with each other.

16 Claims, 4 Drawing Sheets

DISTRIBUTOR MODULE FOR VALVE CLUSTERS AND A VALVE CLUSTER

This application is a National Phase application of International Application No. PCT/EP2004/010285, filed Sep. 15, 2004, which claims priority based on German patent Application No. 10347590.7, filed Oct. 14, 2003, which are incorporated herein by reference.

FIELD OF THE INVENTION

The invention relates to a distributor module for valve clusters, which possess at least one valve unit with a principal valve supplied with pressure medium by way of at least one supply duct and at least one pilot control valve supplied by way of at least one pilot supply duct with pilot pressure medium, said pilot control valve serving for the control of the principle valve, and furthermore a valve cluster fitted with at least one such distributor module.

BACKGROUND OF THE INVENTION

Valve clusters or, respectively, arrangements as a rule comprise several valve units arranged in tandem which for their part possess a principal valve, which is mounted on a base plate having supply and venting duct extending through it or is integrated in the base plate. Such valve clusters are for example described in the German patent publication 4,143,274 A1 or in the European patent publication 0 678 676 B1. Standardized valve units exist, which possess a supply duct for the supply of the principal valves with pressure medium and two pilot supply ducts connected with the supply duct for the supply of the pilot control valves, provided for the principal valves. The pressure medium and the pilot pressure medium are preferably compressed air. The two pilot supply ducts are for example connected by way of linking plate, preferably arranged in series with the valve units, with the supply duct and are necessarily also acted upon by pressure medium when the supply duct is put under pressure. Frequently it is however not necessary to supply both pilot control supply ducts with pressure medium, since for instance for the supply of one of them a single pilot control supply duct is sufficient. If the principal valve is provided with two pilot control valves, the supply may take place by way of a duct branch formed in the principal valve. In order to reroute the pressure medium supply accordingly it is necessary in the case of conventional valve clusters to replace the linking plate by another one, which renders possible a different routing of the pressure medium.

SUMMARY OF THE INVENTION

One object of the invention is to create a distributor module for a valve cluster of the type initially mentioned, which allows for changes in the routing of the pressure medium.

This object is to be achieved by a distributor module for valve clusters with the features of the independent claim 1. Further developments of the invention are recited in the dependent claims.

The distributor module in accordance with the invention is characterized in that it possesses at least one supply duct section and at least two pilot supply duct sections, which are able to be coupled with at least one supply duct and, respectively, with at least two pilot supply ducts of the valve cluster. An interface is provided for the connection of the duct sections with each other, and which has a control element, which is so designed that different switching conditions may be set, in which the supply duct section and the pilot supply duct sections are connected together in different manners. Such switching conditions include at least one first condition, in which the pilot supply duct sections are put in circuit with each other and simultaneously separated from the supply duct section, and at least one second switching condition, in which all duct sections are connected together.

It is now no longer necessary to dismount parts of the valve cluster or, respectively, valve arrangement in order for example to change boards or plates and thus set a different pressure medium routing system. The desired changes may also be performed by the purchaser of the system himself owing to simple handling of the distributor module. Duplicated stockholding of boards is therefore now not necessary. There are no components, that after exchange must be kept available and thus stored separately from the valve cluster. The assembly condition is readily visible externally. Furthermore, conventional valve clusters may be upgraded using the distributor module in accordance with the invention.

As a pressure medium or pilot control pressure medium compressed air is preferably utilized in accordance with the invention. However, other gaseous or hydraulic pressure mediums may be employed. In the case of the interface it is a question preferably of an area of the distributor module at which the duct sections converge together.

Preferably the valve cluster comprises standardized valve units, an individual supply duct and two pilot control ducts being formed.

In the case of a further development of the invention a third switching condition is able to be set, in which all three duct sections are diametrically separated from each other. A fourth switching condition is also available, in which the supply duct section is connected with at least one of the pilot control supply duct sections and simultaneously is separated from at least one other pilot supply duct section.

It is therefore preferred to have at least four switching conditions with which a respectively different routing of the pressure medium or pilot control pressure medium may be set.

In the case of the first switching condition the pilot supply duct sections are uncoupled from the supply duct section and connected with each other so that an external supply of pilot pressure medium, more especially so-called auxiliary pilot air, may have a different pressure than the pressure medium or principal pressure medium. The feed of the pilot pressure medium may take place by way of an individual pilot pressure medium connection, since the pilot supply duct sections are connected together via the distributor module and accordingly pilot pressure medium may pass from one pilot supply duct section to at least one other one.

In the case of the second switching condition all duct sections are coupled with each other so that with the supply of the pressure medium by way of the supply duct the supply of pilot pressure medium is rendered possible simultaneously. In the third switching condition, wherein all duct sections are separated from one another the pilot pressure medium may be supplied from outside, for example in a fashion similar to or identical with the first switching condition. In this case as well it is possible to have the pilot pressure medium at a different pressure than the principal pressure medium. If only one pilot supply duct section should be required for the supply of the pilot pressure medium, the pilot supply duct section not utilized can be employed for other particular purposes, as for example as a venting duct for venting the pilot control valves. So-called "bundled exhaust air" is for instance mandatory for clean rooms.

In the fourth switching condition wherein the supply duct section is coupled with at least one of the pilot supply duct sections and simultaneously is separated from at least one other pilot supply duct section, the supply of pilot control pressure medium may take place internally, i.e. pressure medium may pass from the supply duct section to the interface of the distributor module into the pilot supply duct section. The decoupled pilot supply duct section and accordingly the respective pilot supply duct of the valve cluster may then also be utilized for special projects and purposes.

Using the distributor module in accordance with the invention it is consequently possible to set at least four quite distinct switching conditions so that dependent on the site of use the conditions of use etc. or, respectively, the valve cluster a particular switching condition and accordingly a desired routing of the pressure medium may be set.

The distributor module may possess a mounting area for mounting on a valve cluster and an operating area, opposite to it, for the operation of the control element. At least at the mounting area in the mounted state of the distributor module the duct sections may be orientated to be in line with the respective ducts in the valve cluster, the connection with the interface, which is preferably centrally placed in the distributor module, may be constituted in each case by respectively several duct section bend parts. Pressure medium may therefore enter firstly at the mounting area the distributor module and then redirected, more particularly several times, before it finally arrives at the interface.

Alternatively it is possible to provide an adapter member between the distributor module and the valve cluster, such adapter member having for its part duct portions which at one end are connected with the ducts of the valve cluster and at the other end are connected with the duct sections of the distributor module. The redirection of the pressure medium and its supply to the interface takes place here not at the distributor module itself but in the adapter member.

The interface may be divided up into at least three interface sectors, into which respectively at least one duct section opens. Preferably exactly three interface sectors are provided into which a respective duct section opens. Using the control element it is possible for flow bridges conducting a pressure medium to be opened or closed so that pressure medium may transfer from one sector into a different one or for such transfer to be prevented. It is particularly preferred for the control element to be arranged on the interface relatively movable to it and for it to possess at least three control sectors which are preferably complementary to the interface sectors and are preferably contiguous with each other. The control sectors may be so coupled with the interface sectors that dependent on the setting of the control sectors in relation to the interface sector pressure medium may transfer by way of the respective flow bridge to the respective at least one adjacent interface sector.

The individual interface sectors may be separated by transverse interface partitions and the individual control sectors may be separated by transverse control partitions, there being in the case of an in-line alignment of a transverse control partition in relation to a transverse interface partition such an arrangement that the respective flow bridge between two interface sectors is closed.

The arrangement in circuit of the individual duct sections of the distributor module may therefore be using direct and more particularly mechanical action of the control element in the interface.

As an alternative it is possible to design the interface to comprise at least three mutually separated chambers, that are connected by way of at least one fluid duct, a shut off element being located in the respective fluid duct, which may be opened or closed f. i. using signals via the control element.

It is particularly preferred for the control element to be rotatably mounted on the interface, more particularly by being in the form of a cap-like rotary switch. The position of the control sectors in relation to the non-rotary interface sectors may therefore be changed by turning the control element in relation to the interface.

Between the distributor element and the interface it is possible to have a seal, for example a sealing ring produced of rubber material, which is adapted to the shape of the control sectors and is connected with the control element for rotation therewith. If therefore at least one transverse interface partition is aligned to be flush or in-line with a transverse control partition, the seal will cause a fluid-tight sealing action of the respective mutually adjacent interface sectors.

The control element may comprise detent means for snapping into switching position predetermining a desired switching condition. Preferably detent spurs are provided on the control element, which are able to snap into detent grooves on the interface.

As an alternative it is possible to have the detent spurs on the interface and the detent grooves on the control element.

The distributor module may possess externally visible switching insignia, one of which being associated with one particular switching condition. The switching insignia may for example be numbers, LED elements or the like. Preferably the switching insignia are located on the operating side adjacent to the interface of the distributor module and for example at the periphery of the more particularly circular control element. The control element may comprise at least one actuating means for setting, more particularly by hand, between the different switching conditions, which more especially in cooperation with one of the switching insignia simultaneously indicates as an indicating means the currently selected switching condition.

The invention further contemplates a valve cluster.

As regards further details of the valve cluster attention is drawn to the above description and the following description of a preferred working embodiment of the invention.

BRIEF DESCRIPTION OF THE DRAWINGS

A preferred embodiment of the invention is represented in the drawings and will in the following be described in detail.

DESCRIPTION OF THE PREFERRED EMBODIMENTS

Figure 1:
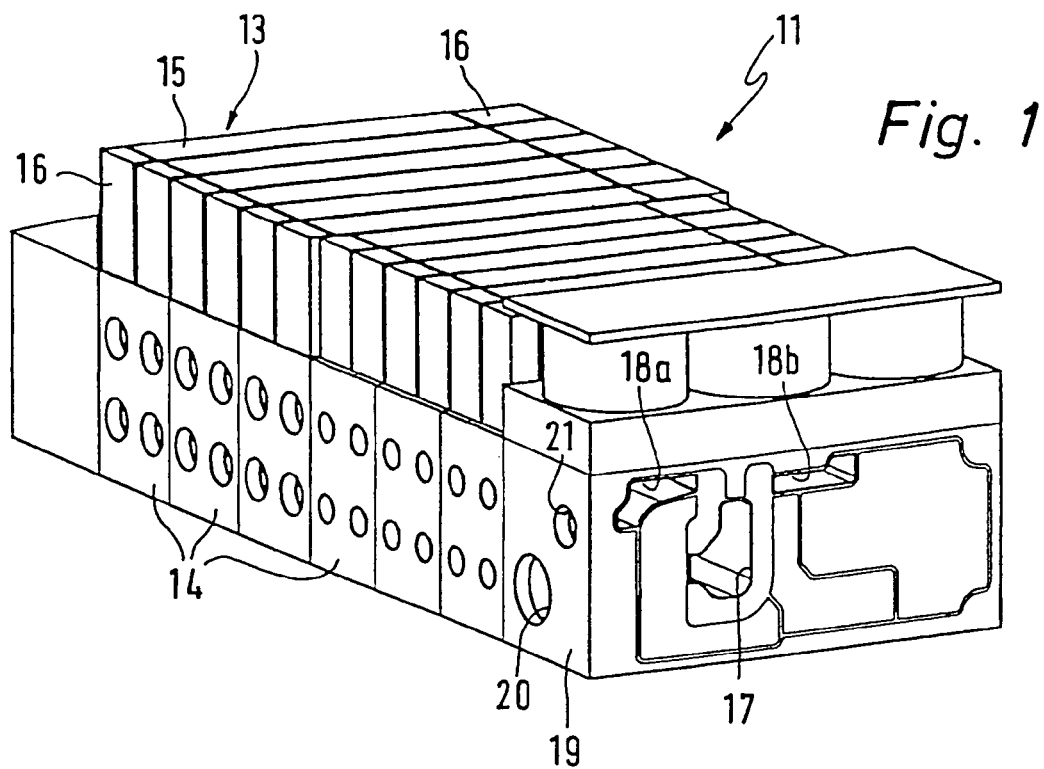
FIG. 1 is a perspective representation of a valve cluster without a distributor module.

FIG. 1 shows a preferred working embodiment of a valve cluster 11 without any distributor module 12, that can be attached to one or both end sides of the valve cluster 11.

The valve cluster 11 illustrated by way of example comprises several individual tandem arranged valve units 13, which are attached together and which comprise a principal valve 15 attached to the top side of a base plate 14. The principal valve 15 provided with at least one pilot control valve 16 (which is preferably arranged on at least one narrow end side of the principal valve 15) for the operation of the principal valve. In accordance with the preferred working example two pilot control valves 16 are provided arranged on either side of the principal valve 15.

Furthermore an alternative design of the valve cluster 11 may be employed composed of several valve units 13, in the case of which the principal valve 15 is integrated in the base plate 14. As a result there is a relatively compact structure of the valve cluster 11.

Each base plate 14 of a valve unit 13 possesses at least three ducts so that by putting the base plates 14 in an array at least one supply duct 17 and at least two pilot control ducts 18a and 18b are constituted which extend through the valve cluster 11 and serve for the supply of the principal valves 15 and the pilot control valves 16 with pressure medium or, respectively, pilot control pressure medium. The valve cluster 11 illustrated for example consists of standardized valve units 13, which for their part possess a supply duct 17 and two pilot control supply ducts 18a and 18b. The pressure medium and the pilot control pressure medium are preferably compressed air. The supply of the pressure medium takes place by way of a supply plate 19 arranged in series with the valve units 13, a supply duct connection 20 and a pilot control supply duct connection 21 being located on the narrow end side of the supply plate 19.

It is also possible to provide two intermediate or supply plates 19 so that a part of the valve cluster 11 may be supplied with pressure medium by way of the one and another part by way of the other intermediate plate 19. Accordingly it is also possible to combine different valve units 13 as represented for example in FIG. 1, the contact face of the two valve unit groups being able to be sealed off in a fluid-tight manner so that no pressure medium may transfer from the one valve unit group to the adjacent one. This means that it is possible to supply the valve unit groups with different pressures.

Figure 2:
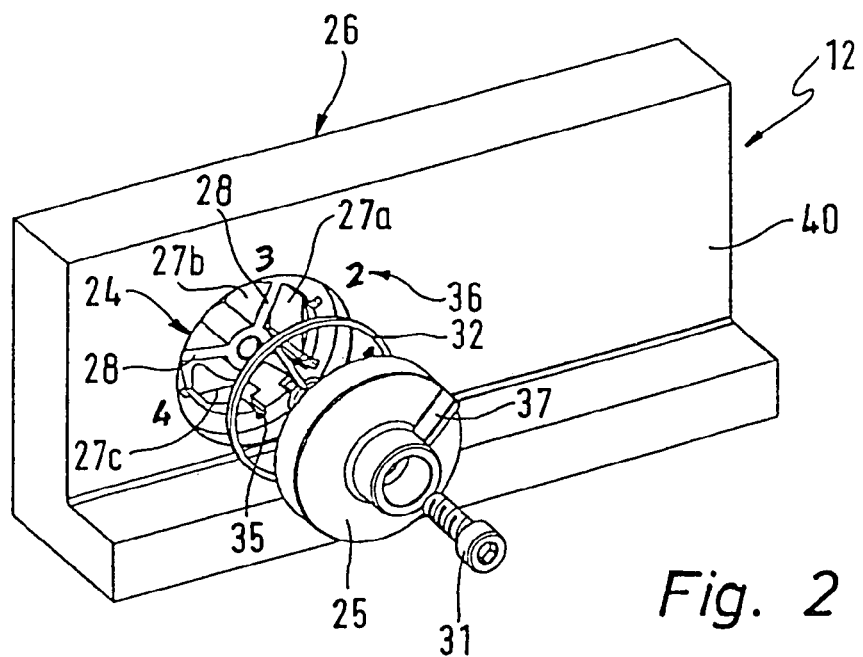
FIG. 2 shows the distributor module in accordance with the invention in a front view.

The valve cluster 11 is sealed off at the end by a distributor module 12 that in FIG. 2 is depicted in a separate view, the distributor module 12 being secured in the longitudinal direction of the cluster in series on the supply plate 19. In the case of an alternative, not illustrated, it is possible for a distributor module 12 to be secured at each end of the valve cluster 11.

Figure 3:
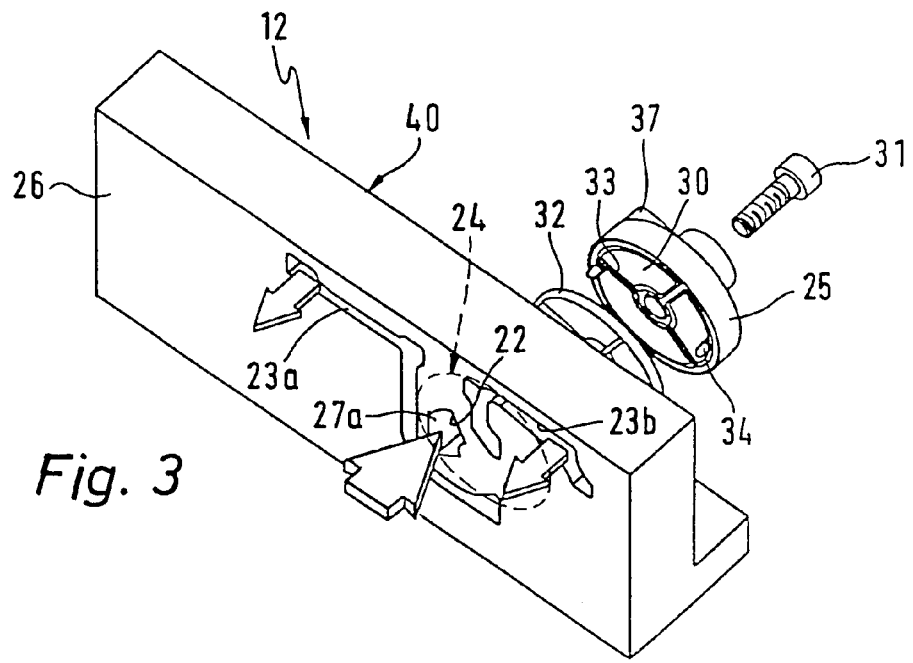
FIG. 3 shows the distributor module of FIG. 2 in a rear perspective showing.

In the following the invention will be described by way of example on the basis of the preferred embodiment with a standardized valve cluster 11, a supply duct 17 and two pilot control ducts 18a and 18b and accordingly with one distributor module 12, more especially illustrated in FIGS. 2 and 3, having a supply duct section 22 and two pilot supply duct sections 23a and 23b. It will be clear that more than one and/or more than two supply duct or pilot supply duct sections 22, 23a and 23b may be provided. The supply duct section 22 and the pilot supply duct sections 23a and 23b are, in the mounted state of the distributor module 12 on the valve cluster 11, coupled with the supply duct 17 and the pilot supply duct sections 18a and 18b so that pressure medium or pilot control pressure medium may pass into the distributor module 12.

On the distributor module 12 there is an interface 24 for connection of the three duct sections 22, 23a and 23b with one another. The interface 24 is provided with a control element 25, which is so designed that different switching conditions may be set, in which the supply duct sections 23a and 23b are differently connected together in circuit as will now be explained in detail.

Like the valve units 13 the distributor module 12 has a platform-like shape with an at least essentially rectangular platform outline. A mounting area 26 is provided for assembly on the valve cluster and more particularly on the intermediate plate 19.

In the mounted state of the distributor module 12 on the valve cluster 11 the duct sections 22, 23a and 23b of the distributor module 12 are in-line with the respective ducts 17, 18a and 18b of the valve cluster 11 at the mounting area 26. The pilot control duct sections 23a and 23b respectively possess several redirecting portions so that they run to the interface 24, which is centrally placed.

Figure 4:
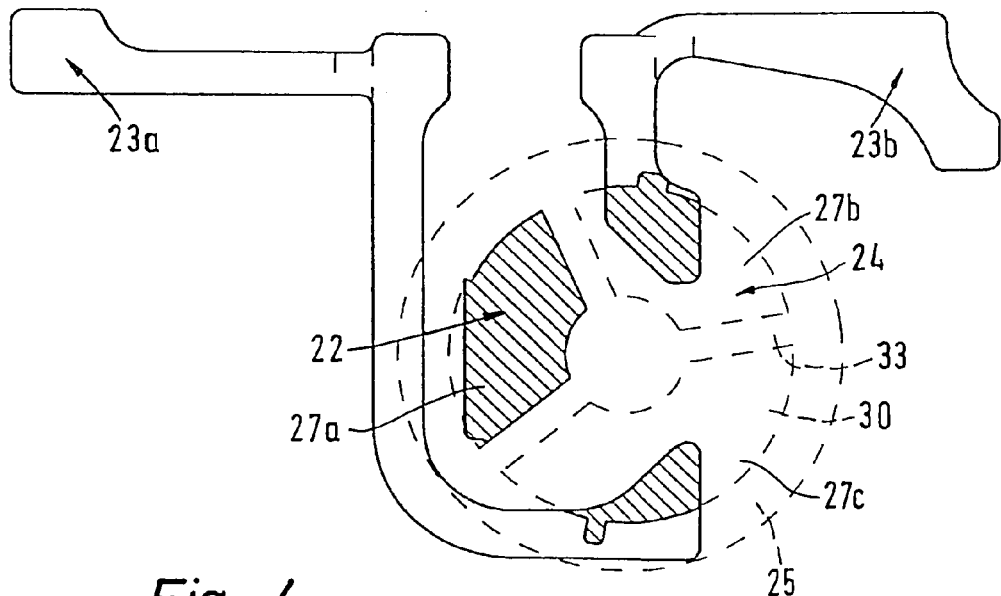
FIG. 4 shows the interface of the distributor module in a diagrammatic representation.
Figure 5I:
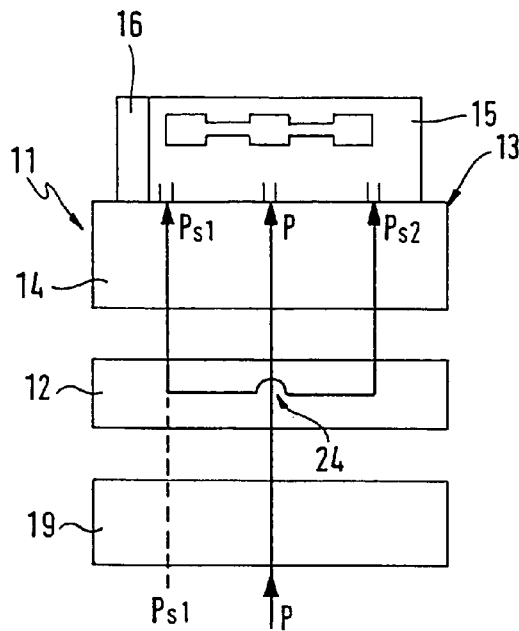
FIG. 5 shows four different switching conditions in accordance with its parts I through IV on the basis of a diagrammatic representation of different duct routing schedules.
Figure 5I:
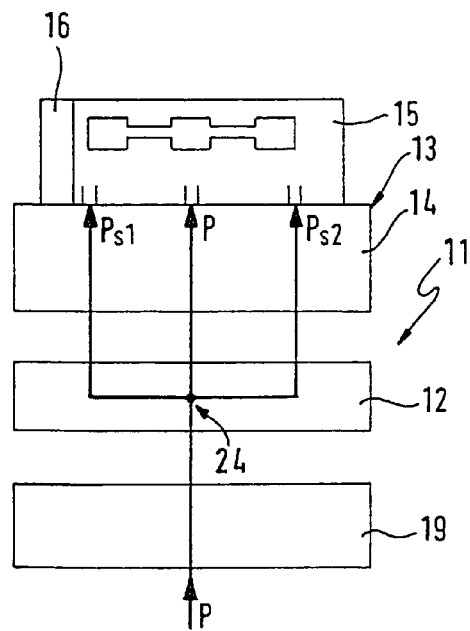
Figure 5I:
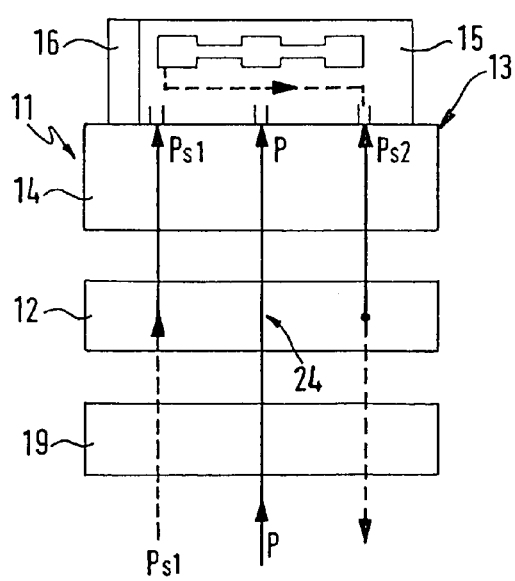
Figure 5I:
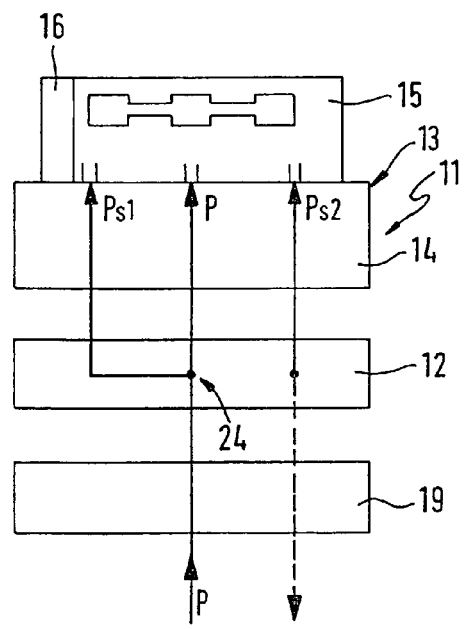
Figure 6I:
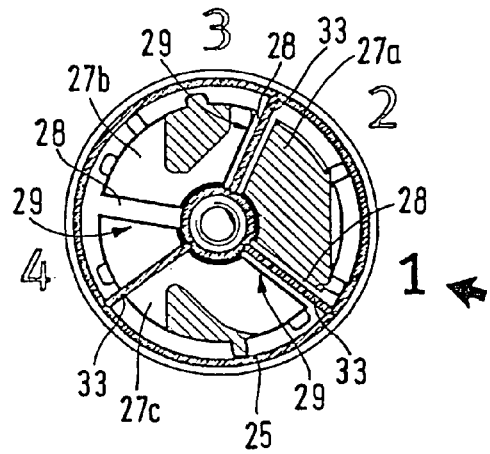
FIG. 6 shows four different switching conditions on the basis of its parts I through IV and on the basis of different positions of the control element.
Figure 6I:
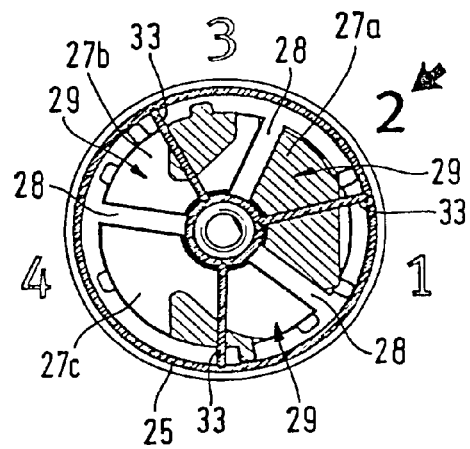
Figure 6I:
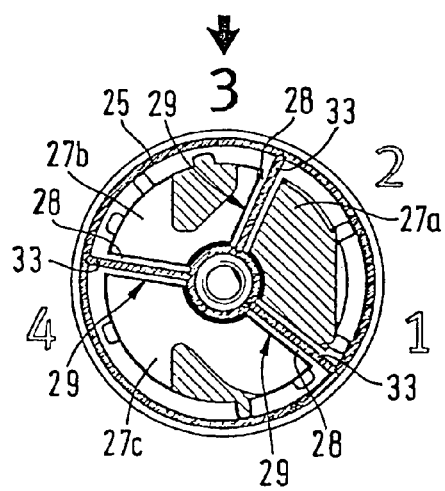
Figure 6I:
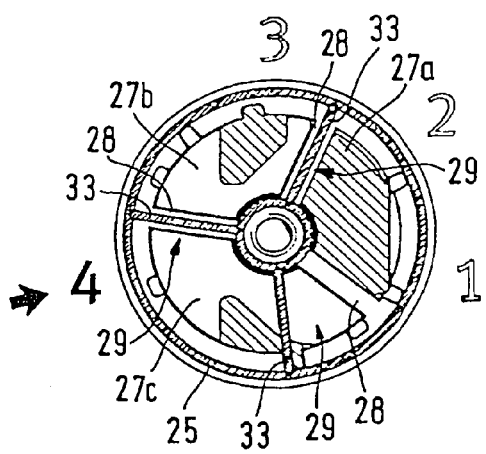

As shown in FIG. 4 and, respectively, FIG. 6 I through FIG. 6 IV by way of example the interface 24 is divided into three sectors 27a, 27b and 27c into which one respective duct section 22, 23a and 23b opens. The sectors 27a, 27b and 27c have a cross section which is larger than the cross section of the opening duct sections 22, 23a and 23b. The interface sectors 27a, 27b and 27c have a circular segment-like cross section and together constitute a circular face, the interface sectors being arranged adjacent to each other and being separated from each other by transverse interface partitions 28, which given a suitable switching condition of the control element 25, described in more detail later, constitute a flow bridge 29 for pressure medium between two adjacent interface sectors 27a, 27b and 27c. It will be clear that other cross sectional shapes of the sectors are possible, for example rectangular, square or similar shape. The control element 25 is by way of example represented on the basis of a rotary switch mounted in a rotary manner on the interface 24. The rotary switch possesses three control sectors 30, which are designed to be complementary to the three interface sectors 27a, 27b, and 27c, and also preferably have the same configuration and size. The rotary switch is attached by an attachment means 31, preferably a screw, in a central manner on the interface 24. Between the rotary switch and the interface 24 there is a seal 32 in the form of a sealing ring, which is adapted to the shape of the control sectors 30, that is say covers both the circular periphery and also the transverse control partitions 33. Given an in-line alignment between a transverse interface partition 28 and a transverse control partition 33 a fluid-tight sealing effect is produced.

The rotary switch furthermore includes detent means in the form of detent spurs 34, which stand proud of the rear side of the rotary switch, more particularly diametrally opposite each other. The detent spurs 34 may on rotation of the rotary switch snap into detent grooves 35 formed at the interface 24, the detent grooves 35 being so distributed about the periphery of the interface 24 that in four different positions of the rotary switch snapping into position is possible so that four different switching positions and hence switching conditions may be set.

The distributor module 12 furthermore comprises switching insignia or symbols 36 in the form of numbers, which are distributed over the periphery of the interface 24 and which respectively represent one switching condition. On the top side of the rotary switch there is an actuating means 37 in the form of a relatively narrow projection rendering possible a manual rotation of the rotary switch and simultaneously indicating the current switching condition of the rotary switch so that the user may see the current switching condition of the distributor module 12.

Using the distributor module 12 in accordance with this embodiment, it is possible for four distinct switching conditions to be set, which are represented by way of example in FIGS. 5 I through IV and 6 I through IV. It will be clear that in the case of other working embodiments of the distributor module less or more than four switching conditions may be set.

In the case of first switching condition able to be selected by rotation of the rotary switch as far as the switching symbol "1", in accordance with FIG. 5 I and FIG. 6 I the pressure medium (P) is fed by way of the supply duct connection 20 on the intermediate plate 19 into the supply duct 17 of the valve cluster 11 and thence transfers to the supply duct section 22 of the distributor module 12. As shown in FIG. 6 I this interface sector 27a is however decoupled from the other two interface sectors 27b and 27c, since the transverse interface partitions 28 delimiting this interface sector 27a are aligned with the transverse control partitions 33 of the rotary switch so that passage of pressure medium to the adjacent interface sectors 27b and 27c is prevented. The pressure medium is accordingly exclusively employed for supply of the principal valves 15 of the valve units 13.

The supply of pilot control pressure medium ($P_{S1}$ and $P_{S2}$) and more particularly of the pilot control auxiliary air takes place in the first switching condition by way of the pilot control duct connection 21 on the supply plate 19 so that pilot pressure medium transfers into one of the two pilot control supply ducts 18a and 18b of the valve cluster 11 and thence to the pilot control supply section 23b of the distributor module 12. Thence the pilot pressure medium flows into the associated interface sector 27c at the interface 24. The position of the rotary switch in relation to the interface 24 is now such that transfer of pilot control pressure medium to the interface sector 27a subject to the principal pressure medium is prevented and that however owing to non-aligned setting of the transverse interface partition 28 in relation to the transverse control partition 33 in the part between the other two interface sectors 27b and 27c pressure medium may flow by way of a flow bridge 29 formed there from the interface sector 27b to the other interface sector 27c.

The two pilot supply ducts 18a and 18b are therefore coupled with each other by way of interface 24 so that in the case of principal valves with two pilot control valves 16, as is the case with those in FIG. 1, both pilot control valves 16 are supplied. Since the pilot control pressure medium is completely decoupled from the principal pressure medium a different pressure thereof may be set.

In the case of the second switching condition, which may be set by selection of the switching symbol "2", all ducts or ducts sections 22, 23a and 23b are connected together as in FIGS. 5 II and 6 II. Accordingly pressure medium (P) or principal pressure medium flows by way of supply duct connection 20 into the supply duct 17 and thence to the supply duct section 22 of the distributor module 12, where it flows into the corresponding interface sector 27a. The position of the rotary switch is, as indicated in FIG. 6 II, now such that no transverse interface partitions 28 are aligned with the transverse control partitions 33 and accordingly between the individual interface sectors 27a, 27b and 27c flow bridges 29 are formed so that transfer of pressure medium into the respectively adjacent interface sectors 27b and 27c is possible. The principal pressure medium (P) is therefore in this case also utilized as the pilot control pressure medium ($P_{S1}$ and $P_{S2}$) There is an internal pilot control supply. The pilot control supply duct connection 21 is in this case closed, for example using a screw plug.

In the case of third switching condition able to be selected by selection of the switching symbol "3" all ducts or duct sections 22 and 23a and 23b are decoupled from each other as indicated in FIGS. 5 III and 6 III. This is achieved by suitably setting the switch in relation to the interface 24 so that all transverse interface partitions 28 are aligned in relation to the transverse interface partitions and the interface sectors 27a, 27b and 27c are separated from each other in a fluid-tight manner. Accordingly n principal pressure medium (P) flows by way of interface 24 into the pilot control supply ducts 18a and 18b so that again it is necessary to provide for an external pilot control supply duct 18a. Since for this purpose only one pilot control supply duct 18a is necessary—in the case of principal valves 15 having two pilot control valves 16 division in the valve may be present—the other pilot control supply duct 18b may be employed for special applications. Such a special application is for example venting the pilot control valves 16 by way of this duct as a so-called "bundled exhaust facility".

In the case of the fourth switching condition, which is selected by the selection of the switching symbol "4", as illustrated in FIGS. 5 IV and 6 IV, the supply duct 17 is connected with one of the two pilot control supply ducts 18a. As shown in FIG. 6 IV in this case owing to the position of the rotary switch an interface sector 27b (associated with a pilot supply duct section 23a) is separated from the other two interface sectors 27a and 27c in a fluid-tight manner, whereas between the other two interface sectors a flow bridge 29 exists. The principal pressure medium (P) is again utilized as a pilot control pressure medium ($P_{S1}$). The coupled duct 27b may again be employed for special purposes, for example for "bundled exhaust".

What is claimed is:

1. A distributor module for valve clusters, which possess at least one valve unit with a principal valve supplied by way of at least one supply duct with pressure medium, and for the control thereof at least one pilot control valve supplied with pilot control pressure medium by way of at least one pilot control supply duct, said distributor module comprising:

at least one supply duct section which is able to be coupled with at least one supply duct of the valve cluster and at least two pilot supply duct sections, which are able to be coupled with at least two pilot supply ducts of the valve cluster, an interface for the connection of the duct sections with each other, said interface having a control element associated with it, said control element being so designed that different switching conditions may be set, in which the supply duct section and the pilot supply duct sections are put differently in circuit, of which at least in the case of a first switching condition the pilot supply duct sections are connected together and simultaneously are separated from the supply duct section and at least in the case of a second switching condition all duct sections are connected with one another.

2. The distributor module as set forth in claim 1, comprising one supply duct section which is coupled with the supply duct of the valve cluster and by two pilot control ducts, which may each be coupled with a pilot control duct of the valve cluster.

3. The distributor module as set forth in claim 1, wherein a third switching condition may be set, in which all duct sections are separated from each other.

4. The distributor module as set forth in claim 1, wherein the a fourth valve cluster may be set, in which the supply section is connected with at least one of the pilot supply duct sections and simultaneously is separated from at least other pilot supply duct section.

5. The distributor module as set forth in claim 1, comprising a mounting area for mounting on a valve cluster and an oppositely placed operating face for the operation of the control element, preferably the duct sections at least adjacent to the mounting area in the mounted state of the distributor module being aligned with the respective ducts in the valve cluster and the connection with the interface being constituted in each case by several duct section flow redirecting portions.

6. The distributor module as set forth in claim 1, wherein the interface is divided up into at least three more particularly contiguous interface sectors into which in each case at least one and more particularly a single duct section opens, and by means of the control element flow bridges conducting the pressure medium between the interface sectors may be opened and closed.

7. The distributor module as set forth in claim 6, wherein the control element arranged on the interface is movable in relation to it and has at least three more particularly contiguous control sectors, the control sectors being able to be so coupled with the interface sectors that dependent on the position of the control sectors in relation to the interface sector pressure medium may be transferred by way of the respective flow bridge to respectively adjacent interface sectors.

8. The distributor module as set forth in claim 7, wherein the individual interface sectors are separated from one another by transverse interface partitions and in the case of an aligned state of a transverse control partition with a transverse interface partition the associated flow bridge is closed.

9. The distributor module as set forth in claim 7, wherein the control element is rotatably supported on the interface and is more particularly in the form of a cap-like rotary switch, the position of the control sectors in relation to the non-rotary interface sectors may be changed by rotation of the control element in relation to the interface 24.

10. The distributor module as set forth in claim 7, wherein the interface sectors and preferably the control sectors have the cross section of a circular segment and more particularly in the fitted together condition constitute a circular face.

11. The distributor module as set forth claim 1, wherein between the control element unit interface a seal is arranged for fluid-tight sealing of respectively adjacent interface sectors with the flow bridge closed in each case, which preferably is adapted to the shape of the control sectors and is connected with the control element in a non-rotary manner.

12. The distributor module as set forth in claim 1, wherein the control element possesses detent means for snapping into a switching position corresponding to a desired switching condition, detent spurs being preferably on the control element, which may snap into detent grooves on the interface.

13. The distributor module as set forth in claim 1, comprising externally visible switching insignia or symbols, more particularly numbers, each thereof corresponding to a predetermined switching condition and more particularly the switching symbols are arranged on the operating side of the distributor module adjacent to the interface, more particularly adjacent to the periphery of the preferably circularly designed control element.

14. The distributor module as set forth in claim 13, wherein element possesses at least one actuating means for more particularly manual switching over between the different switching conditions, such element more particularly cooperating with one of the switching symbols simultaneously indicates the currently selected switching condition as an indicating element.

15. The distributor module as set forth in claim 1, wherein it is designed in the form of a valve unit with one principal valve supplied with pressure medium by way of at least one supply duct and at least one pilot control valve serve for the control of same and supplied by way of at least one pilot control supply duct with pilot control pressure medium.

16. A valve cluster comprising at least one valve unit, which has a principal valve supplied by way of at least one supply duct with pressure medium, and by way of at least one pilot supply duct with pilot pressure medium, comprising at least one distributor module as set forth in claim 1.

* * * * *